United States Patent [19]

Nakamuta

[11] Patent Number: 4,460,926
[45] Date of Patent: Jul. 17, 1984

[54] TIME BASE CORRECTING DEVICE FOR AUDIO AND VIDEO SIGNALS

[75] Inventor: Shozo Nakamuta, Saitama, Japan

[73] Assignee: Pioneer Video Corporation, Tokyo, Japan

[21] Appl. No.: 382,837

[22] Filed: May 27, 1982

[30] Foreign Application Priority Data

May 29, 1981 [JP] Japan .................................. 56-82175

[51] Int. Cl.³ ......................................... H04N 9/491
[52] U.S. Cl. .................................... 358/325; 358/326
[58] Field of Search ............... 358/322, 325, 326, 320, 358/321, 324, 337, 342, 323; 360/8, 9.1, 36.1

Primary Examiner—John C. Martin
Assistant Examiner—Jeffrey Sutherland
Attorney, Agent, or Firm—Sughrue, Mion, Zinn, Macpeak & Seas

[57] ABSTRACT

A time base correction device for use with a video disc reproduction system corrects the time base of the color video signal according to the phase difference between a reference signal and a color burst signal; and the time base of the audio signal is corrected according to the phase difference between a reference signal and a horizontal synch signal extracted from the video signal.

9 Claims, 2 Drawing Figures

TIME BASE CORRECTING DEVICE FOR AUDIO AND VIDEO SIGNALS

BACKGROUND OF THE INVENTION

This invention relates to time base corresponding device for recorded data reproducing devices, and more particularly to a time base correcting device for eliminating a time base variation caused in reproducing color video data and audio data which have been recorded on a recording medium.

In reproducing color video data, it is essential that the resultant color image is stable, correct and uniform in color. In the case where the recording medium is a video disc, the center of rotation of the video disc is shifted from the center of the record track when loaded on the turntable. Therefore, a color video signal corresponding to one revolution of the video disc includes a time base variation of 20 $\mu$s or more, which is extremely large compared to the maximum allowable value of 5 $\mu$s for correctly reproducing the color video signal.

Therefore, it is essential for a video disc reproduction system to include a device for eliminating the time base variation. The circuit arrangement of such a device is as shown in FIG. 1. In FIG. 1, a reproduced RF (radio frequency) signal from a pickup (not shown) is applied to band-pass filters 1 and 2, and is divided thereby into a color video RF signal and an audio RF signal. The video RF signal and the audio RF signal are demodulated into a video signal and an audio signal by demodulators 3 and 4, respectively. The color video signal thus obtained is applied to a burst gate 5, to separate a color burst signal therefrom. The phase of the color burst signal and the phase of a subcarrier signal from a reference signal oscillator 6 are subjected to comparison in a phase comparator 7. The latter 7 outputs a phase difference signal, which represents the time base variation data of the reproduced signal. Therefore, if an actuator 8 is driven by this phase difference signal to move the pickup detection point position in the direction tangential to the recording track, the time base can be corrected.

In the prior art, no burst signal exists for about 9H (about 570 $\mu$s), which is the vertical blanking period or flyback time of the color video signal, and therefore during this period the phase difference signal varies at random, thus including a noise component. That is, an unwanted time base variation takes place. The time base variation causes no problems with the video signal, because it takes place during the vertical blanking period; however, it causes periodic noises in the audio signal, causing a serious problem.

SUMMARY OF THE INVENTION

An object of this invention is thus to provide a time base correcting device in which the above-described drawbacks in the prior art have been eliminated, and wherein video and audio signals which are stable and are corrected can be obtained.

In particular, the time base correcting device for a recorded data reproducing device according to the invention is characterized in that the video data and audio data in a reproduced signal from a pickup are separated therefrom so that the time base corrections of the video data and of the audio data are effected independently, and in that the time base correction of the video data is carried out with a variable delay element according to the phase difference between a reproduced color burst and a reference signal, while the time base correction of the audio data is carried out with a variable delay element according to the phase difference between a horizontal synchronizing signal and a reference signal.

DETAILED DESCRIPTION OF THE PREFERRED EMBODIMENTS

Figure 1:
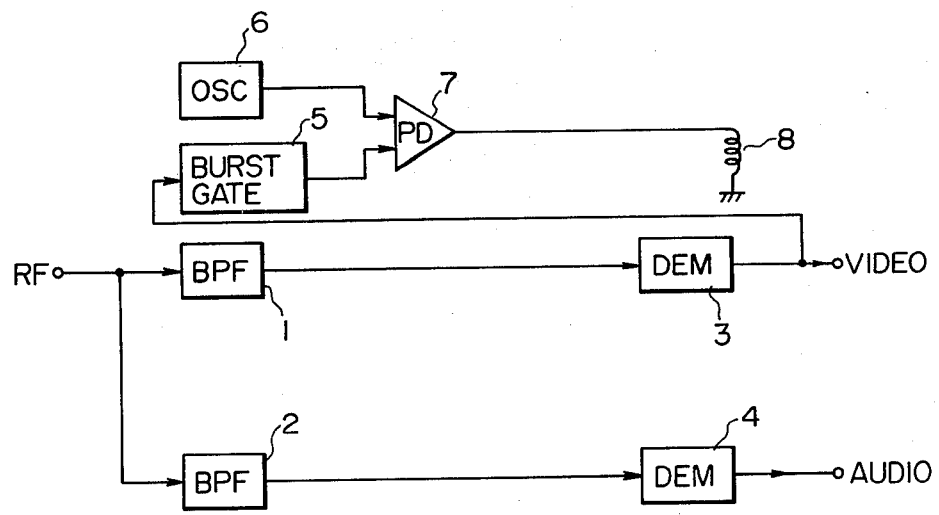
FIG. 1 is a block diagram of a conventional time base correcting device.
Figure 2:
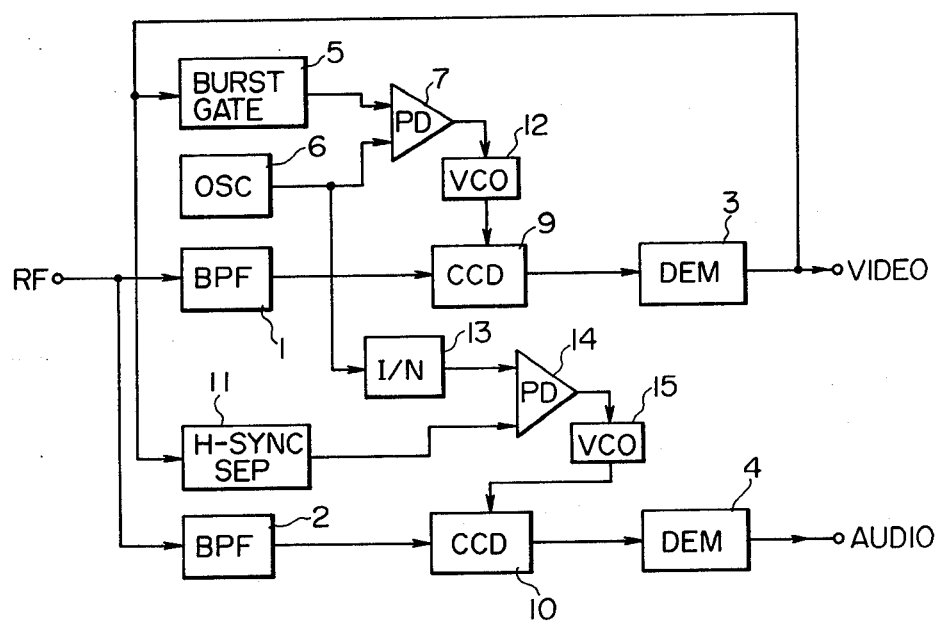
FIG. 2 is a block diagram showing one embodiment of this invention.

This invention will now be described with reference to FIG. 2. FIG. 2 is a block diagram showing one embodiment of the invention. In FIG. 2, parts corresponding to those shown in FIG. 1 are designated by similar reference numerals or characters. A reproduced RF signal from a pickup (not shown) is applied to band-pass filters 1 and 2, to divide it into a color video RF signal and an audio RF signal. The video RF signal and the audio RF signal are applied through charge-coupled devices (CCD's) 9 and 10, which are variable delay elements, to demodulators 3 and 4, respectively. The output signal of the demodulator 3, i.e., a video signal obtained through demodulation, is applied to a color burst gate 5 and to a horizontal synchronizing separator 11, as a result of which a color burst signal and a horizontal synch signal are extracted. The burst signal and a subcarrier signal from a reference signal oscillator 6 are applied to a phase comparator 7, where they are subjected to phase comparison, as a result of which a phase difference signal is outputted by the phase comparator 7. A VCO (voltage-controlled oscillator) 12 outputs an oscillation frequency corresponding to the level of the phase difference signal. The oscillation output of the VCO 12 is employed as a clock pulse to control the amount of delay of the CCD 9.

On the other hand, the horizontal synchronizing signal extracted as above, and the frequency division signal from a frequency divider 13 adapted to frequency-divide the output of the oscillator 6, are subjected to phase comparison in a comparator 14. Therefore, the frequency division signal frequency is set equal to the horizontal synch signal frequency. Instead of frequency-dividing the oscillation output of the subcarrier oscillator 6, another oscillator may be employed. The oscillation frequency of a VCO 15 is controlled according to the level of the phase difference signal, and the oscillation output phase of the VCO 15 is employed as a clock pulse to control the delay of the CCD 10.

Thus, the time base of the color video data can be corrected with the accuracy defined by the color burst signal frequency, and the resultant color image is uniform in color, correct and stable. As the horizontal synch signal exists in the vertical synchronizing interval, the time base of the audio signal can also be corrected.

In general, video and audio signals are recorded by the FM modulation system. In the case where the time base corrections of these signals are effected after the signals are applied to the variable delay elements 9 and 10, a method may be employed in which, as shown in FIG. 2, the frequency-modulated signals are used as they are, or alternatively a method may be employed in which the time base correction is carried out after one or both of the modulated signals are demodulated. In the case of a video disc in which at least two audio channels are recorded, in a system correcting the time base in the frequency-modulated signal stage as shown in FIG. 2, after the time base correction has been effected for two channels, the signals may be assigned to the channels, or, after the signals have been assigned to the channels, time base correction may be carried out for each channel. In a system of correcting the time base after the signals have been demodulated, the time base correction should be carried out for each channel.

Let us study the numerical data which obtain when charge-coupled devices (CCD) are employed as time base correcting means for the video and audio data. First, the CCD of the video system will be described. As the frequency band of the video system's base band is 0 to 4.2 MHz, it is desirable that the lowest frequency $f_{1\ min}$ of the clock signal be at least 10 MHz. If the highest operable frequency $f_{1\ max}$ of the clock signal in the present device is 15 MHz, and the time base error to be corrected is 35 µs, then the following equation holds:

$$n_1(1/10 - 1/15) = 35$$

where $n_1$ is the number of stages in the CCD.

Therefore, $n_1 = 1050$ (stages). In this case, $$t_{1a} = 1050 \times 1/10 - \tfrac{1}{2} \times 35 = 87.5\ \mu s,$$

and $$f_{1a} = 1050/87.5 = 12\ MHz$$

where $t_{1a}$ is the average delay time, and $f_{1a}$ is the clock frequency at that time.

If the highest frequency $f_{1e\ max}$ of the error signal is 2 KHz, then the corresponding average delay phase $\phi_{1d}$ is 63°, as can be found from the following expression:

$$\phi_{1d}/2\pi f_{1e\ max} = t_{1a}$$

The value of 63° is practical in the time base correction servo loop.

Now, the audio system will be described. It is assumed that the audio signal is corrected with FM and RF signals of 2.3 MHz and 2.81 MHz. If the same ratio as that in the case of the video system is taken for the lowest frequency $f_{2\ min}$ of the clock signal, then $$f_{2\ min} = 10/4.2 \times 2.81 = 6.7\ MHz$$

The time base error to be corrected is 35 µs, and therefore $$n_2 (1/6.7 - 1/f_{2\ max}) = 35\ \mu s$$

If $f_{2\ max}$ is 15 MHz, the $n_2 = 424$ (stages). Thus, for the audio system it is advantageous that, after the time base correction of the video system has been ensured, $n_2$ and $f_{2\ max}$ may be determined from power consumption and the number of stages which can be integrated.

As is apparent from the above description, the invention has the effect that, while producing a correct color video image, an audio signal free from noise can also be obtained.

In operation, an optical pickup reads signals from a disc without contacting the latter. For this purpose, the optical pickup is provided with a focus servo mechanism for forming a beam spot on the disc with high accuracy at all times, a tracking servo mechanism for allowing the beam spot to follow the track, and a tangential servo mechanism for moving the beam spot in the direction tangential to the track. Therefore, the focus lens, the tracking mirror, and the tangential mirror are vibrated by being controlled by the respective servo systems. If one of the vibrating systems carries out unwanted operations due to noise or disturbance, then the unwanted operation appears as a non-uniform coloring or as a drop out of the reproduced signal. Therefore, it is desirable that the mechanical vibrating systems are as simple in construction as possible. In this connection, according to the invention, the tangential mirror may be eliminated. Thus, the reproduction signal is stable according to the invention. This effect can be equally applied to other contact type reproduction devices.

What is claimed is:

1. A time base correcting device for a reproducing device for use with a recording medium in which color video data and audio data are recorded, comprising;
   means for separating and extracting a color burst signal and a horizontal synchronizing signal from a reproduced signal output from a pickup;
   video signal time base correcting means for correcting the time base of said color video data according to a first phase difference between said color burst signal and a first predetermined reference signal; and
   audio signal time base correcting means for correcting the time base of said audio data according to a second phase difference between said horizontal synchronizing signal and a second predetermined reference signal.

2. A device as claimed in claim 1, wherein said video signal time base correcting means corrects the time base of a signal modulated with a video signal, and said audio signal time base correcting means corrects the time base of a signal modulated with an audio signal.

3. A device as claimed in claim 2, said video signal time base correcting means and said audio signal time base correcting means including variable delay means for delaying said modulated signals in response to said phase differences, and in amounts corresponding to said respective first and second phase differences.

4. A device as claimed in claim 1, wherein said video signal time base correcting means corrects the time base of a video signal obtained by demodulating said reproduced signal, and said audio signal time base correcting means corrects the time base of an audio signal obtained by demodulating said reproduced signal.

5. A device as claimed in claim 4, said video signal time base correcting means including variable delay means for delaying said video signal by an amount corresponding to said first phase difference, said audio signal time base correcting means including variable delay means for delaying said audio signal by an amount corresponding to said second phase difference.

6. A device as claimed in claim 1, wherein said audio signal is of one or more channels.

7. A device as claimed in claim 1, said video signal time base correcting means including a voltage controlled oscillator receiving a signal indicative of said first phase difference, and delay means comprising charge coupled devices connected to said oscillator.

8. A device as claimed in claim 1, said audio signal time base correcting means comprising a voltage controlled oscillator receiving a signal indicative of said second phase difference, and delay means comprising charge coupled devices connected to said oscillator.

9. A device as claimed in claim 8, further including division means for generating said second predetermined reference signal from said first predetermined reference signal.

* * * * *